Figure 1:
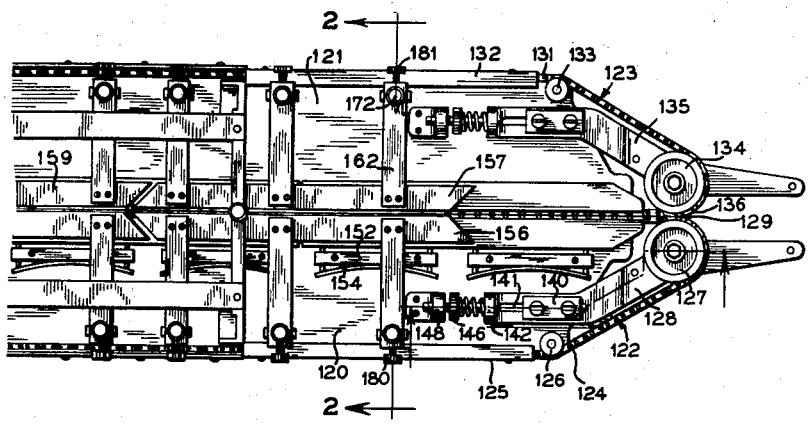

Dec. 2, 1958 J. J. GREVICH 2,862,605
CONVEYOR CHAIN

Original Filed July 1, 1953 2 Sheets-Sheet 1

INVENTOR
JOHN J. GREVICH

BY A. Yates Dowell
ATTORNEY

Dec. 2, 1958  J. J. GREVICH  2,862,605
CONVEYOR CHAIN

Original Filed July 1, 1953  2 Sheets-Sheet 2

INVENTOR.
JOHN. J. GREVICH
BY
*Attorneys*

United States Patent Office 2,862,605
Patented Dec. 2, 1958

2,862,605

CONVEYOR CHAIN

John J. Grevich, St. Paul, Minn., assignor to Doughboy Industries, Inc., New Richmond, Wis., a corporation of Wisconsin Original application July 1, 1953, Serial No. 365,426, now Patent No. 2,727,648, dated December 20, 1955. Divided and this application May 31, 1955, Serial No. 512,165

7 Claims. (Cl. 198—162)

This invention relates to packaging and the enclosure of commodities in air tight containers or packages in order to preserve and maintain the same in their original condition.

Specifically, the invention relates to machines for sealing containers or packages and having conveyor chains for moving the package through the machine. The invention contemplates a conveyor chain which produces minimum noise in use and is sometimes referred to as "silent chains."

This application is a division of applicant's application Serial No. 365,426, filed July 1, 1953, now Patent No. 2,727,648.

Heretofore, conveyor chains have been used which were not the silent type and have therefore caused quite a racket or noise highly objectionable to both the operators of the apparatus and persons nearby. Psychologists now say that noise can unconsciously cause fatigue in people constantly subjected to such noise. Furthermore, the previous conveyor chains supported on a vertical surface tended to sag and get out of line between pulleys or gears. This sagging has been a disadvantage leading to constant breaking down of apparatus using this type of chain and causing generally unsatisfactory operation of such apparatus when it is working. Also, previously devised vertically supported conveyor chain guiding mechanisms have had the disadvantage of frictional contact with one complete side of the conveyor chain thereby causing an undue amount of wear of both the chain and trackway.

It is therefore an object of this invention to provide a generally horizontal conveyor chain supported and guided on a vertical surface that satisfactorily overcomes the above enumerated disadvantages and which is not subject to sagging, linking, or an undue amount of wear caused by friction created between the chain and the surface.

Another object of this invention is to provide an improved pressure mechanism for guiding and holding two opposed conveyor chains together for conveying articles between the conveyor chains which stabilize the chains in alignment at all times and affords more freedom of movement of the chain while less noise is created by the movement of the chain over the surface.

Figure 2:
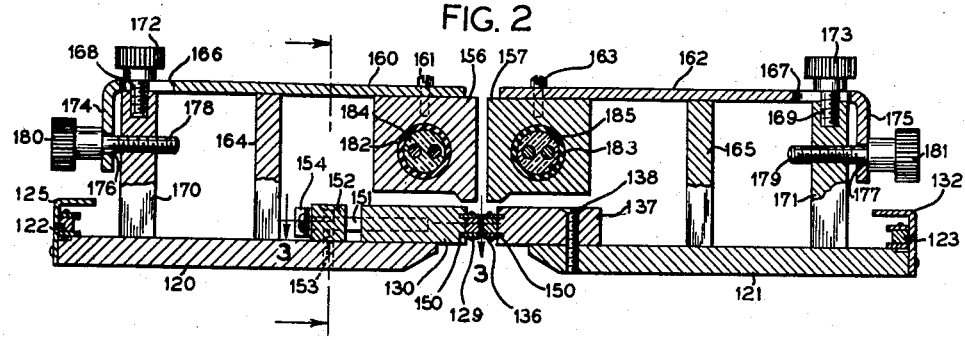
Figure 3:
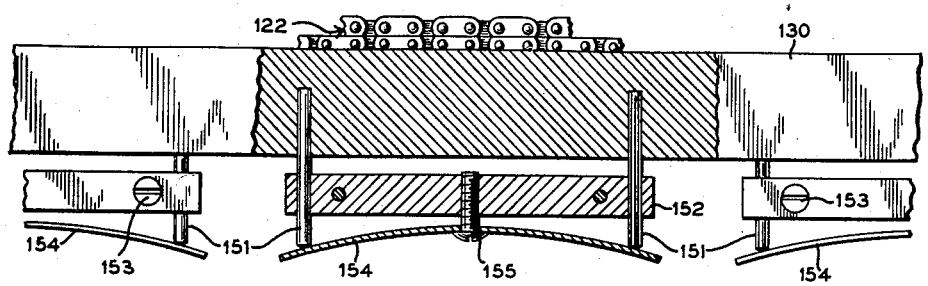
Figure 4:
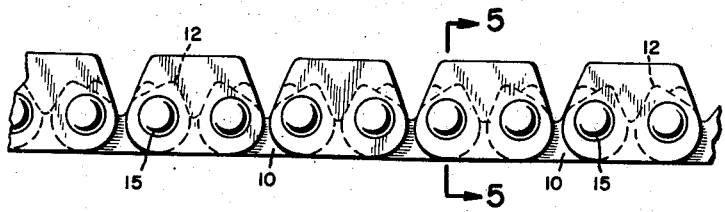
Figure 6:
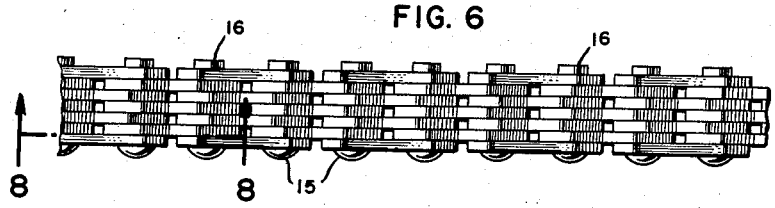
Figure 7:
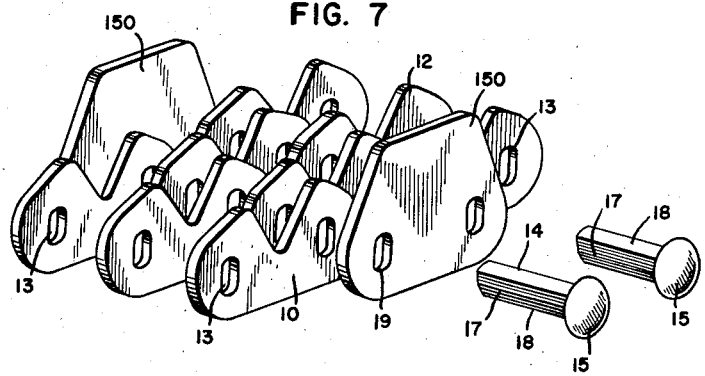
Figure 5:
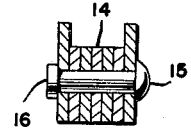

Further objects and advantages of the invention will be apparent from the following description taken in conjunction with the drawings wherein:

Fig. 1 is a fragmentary top plan view with parts in section of the heat sealing mechanism with which a conveyor chain of the present invention is used;

Fig. 2, a sectionanal view taken on the line 2—2 of Fig. 1 showing the conveyor chain and its guiding mechanism;

Fig. 3, a sectional view taken on the line 3—3 of Fig. 2 with parts broken away to show the chain and the pressure mechanism;

Fig. 4 a vertical plan view of the conveyor chain with the links behind the side plates shown in dotted lines;

Fig. 5, a sectional view taken on line 5—5 of Fig. 4;

Fig. 6, a top plan view of the conveyor chain;

Fig. 7, an exploded perspective view of the chain and its complements; and

Figure 8:
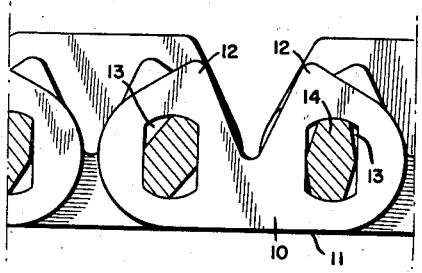

Fig. 8, a sectional view taken on line 8—8 of Fig. 5.

Briefly, the conveyor chain and guiding mechanism of the present invention involves a silent chain having large side plates attached to every other link of the chain and extending beyond one side of the chain; the side plates guiding the chain over a pressure mechanism which has two parallel slotted trackways therein for accommodating the conveyor chain side plates.

As this is a division of Serial No. 365,426, the following description is limited to only the structure necessary to disclose the present invention.

As illustrated in Figs. 1 and 2, the sealing apparatus comprises base plates 120 and 121 supporting conveyor chains 122 and 123 respectively, the outer run 124 of chain 122 being covered by guard 125 secured to the bed plate 120 and trained around guide roller 126 also secured to the bed plate 120. Chain 122 continues to the entrance end of the machine where it is trained over pulley 127 mounted over the bracket 128. The inner run 129 of the conveyor chain 122 engages the pressure bar 130 mounted on the bed plate 120 in such a manner to urge the inner run 120 of the feed chain 120 toward the right as viewed in Fig. 2. The structure for accomplishing this purpose will be presently described.

The outer run 131 of the conveyor feed chain 123 is covered by guard 132 secured to the rear bed plate 131. This chain is trained around the guide roller 133 and further trained around a pulley mounted around the entrance end of the machine. Pulley 134 is mounted on a bracket 135 in a manner similar to pulley 127. The inner run 136 of chain 133 engages a backing bar 137 secured to the rear bed plate 121 by screw threaded fastening means or the like 138.

As best shown in Fig. 1 pulley 127 is mounted on bracket 128 serving to maintain tension on the front feed chain 122. For this purpose bracket 128 is slidably mounted on the front bed plate 130 by means of screw threaded fastening means or the like extending through a bearing plate 140 and a slot 141 in the bracket 128 and secured to the bed plate 120. Bearing plate 140 engages the upper surface of bracket 128 and maintains the same in proper position during sliding movement thereof longitudinally of the apparatus in order to exert tension on feed chain 122. The inner end of bracket 128 is provided with an upstanding portion 142 having an aperture for slidably receiving a pin about which is disposed a compression spring, one end of the compresison spring engaging the outer surface or upstanding portion 142. The opposite end of the compression spring engages a knurled enlargement 146 on the pin 144, the opposite end of the pin being threaded and threadedly received in an aperture in an angle bracket 148 secured to the bed plate 120 by screw threaded fastening means or the like. Manipulation of the pin by means of the knurled enlargement 146 serves to increase or decrease the pressure on the compression spring and consequently varies the tension exerted on the spring 122 by means of the pulley 127.

The bracket 135 which carries pulley 134 engaging the rear chain 123 is mounted in a similar manner and may be adjusted in order to properly tension the chain 123. The opposite sides of the chain links are provided with extending projections 150 which are received in grooves in the backing bars 137 and pressure bars 130 in order to maintain the chains 122 and 123 in proper alignment during feeding of the containers to the sealing rolls.

As best shown in Figs. 1, 2 and 3 the front feed chain 122 is maintained in engagement with the rear feed chain 123 during feeding movement thereof by means of pressure bars 130 which are slidably mounted on the upper surface of the front bed plate 120. In order to exert resilient pressure on feed chain 122 a plurality of pins 151 are slidably mounted in blocks 152 secured to the upper surface of bed plate 120 by screw threaded fastening means or the like 153. The inner end of the pins 151 are received in apertures in pressure bars 130. The rear ends of the pins 151 are engaged by leaf spring 154 which is secured to the block 152 adjacent the center of the spring 154 by screw threaded fastening means or the like 155. The screw 155 serves to increase or decrease pressure exerted on pins 151 and consequently serves to vary the pressure on the chain 122 which tends to urge the same into engagement with opposite feed chain 123 or into engagement with containers when the same ore positioned therebetween for feeding to sealing rolls. The backing bars 137 are attached to bed plate 121 by screws 138.

The heater bars 156 and 157 illustrated in Figs. 1 and 2 are supported above the conveyor chains 122 and 123 along their center run. The preheater bars 156 and 157 are mounted on the bed plates 120 and 121 by means of a bracket 160 secured to the bar 156 by screw threaded fastening means or the like 161 and a bracket 162 secured to the preheater bar 157 by screw threaded fastening means or the like 163. Brackets 160 and 162 are slidably supported substantially at their midpoint by upstanding posts 164 and 165 respectively, secured to the bed plates 120 and 121. In addition the brackets 160 and 162 are provided with slots 166 and 167 for receiving clamping screws 168 and 169 threadedly received in the upper ends of posts 170 and 171 secured to bed plates 120 and 121. Clamping screws 168 and 169 are provided with finger engaging knobs 172 and 173 in order to permit convenient manipulation thereof. The outer ends of the brackets 160 and 162 are provided with downturned portions 174 and 175 having apertures 176 and 177 for rotatably receiving adjusting screws 178 and 179 threadedly received in posts 170 and 171 respectively. Adjusting screws 178 and 179 are also provided with finger engaging knobs 180 and 181 in order to permit convenient manipulation thereof.

In operation the preheater bars 156 and 157 are adjusted toward and from each other in order to accommodate containers of different thicknesses by first loosening the clamping screws 172 and 173. The adjusting screws 178 and 179 are then rotated by knobs 180 and 181 and bars 156 and 157 together with the brackets 160 and 162 are moved inwardly to the desired position whereupon clamping screws 172 and 173 are tightened to firmly retain the bars 156 and 157 in a definite position. If it is desired to retract the bars 156 and 157 it is only necessary to loosen the clamping screws 172 and 173 and to back off the adjusting screws 178 and 179 whereupon the bars 156 and 157 together with the brackets 160 and 162 may be manually moved apart and then clamped to the adjusted position by tightening the clamping screws 172 and 173.

Preheater bars 156 and 157 are provided with longitudinal bores 182 and 183 which serve to receive heating elements 184 and 185 which may be supplied with electrical energy in a well known manner. Likewise a supply of electrical energy to these heating elements 184 and 185 may be thermostatically controlled to maintain the desired temperature.

The conveyor chain will now be described.

As illustrated in Figs. 4 to 8 of the drawings, the conveyor chain is a so-called "silent chain" made up of a plurality of groups of uniform links 10, as many of such links being employed as may be necessary, dependent upon the width and length of the chain required. Each link is formed as illustrated in Fig. 8 with a straight rear edge 11 and with two teeth 12 extending from its front edge. Openings 13 are provided in the links 10 having parallel straight side walls and curved walls at the bottom and top of the openings.

Pins 14 having a head 15 extend through openings 13 to hold links 10 together and are turned over at their opposite ends thereby forming a flattened abutment 16 to lock the pin in place in the chain. The vertical dimension of the cross section of the pin body is substantially as high as the space between the curved top and bottom walls of the openings 13 in links 10. Each pin body is of a width substantially that of the distance between the parallel side walls of the opening 13 in the links and along their opposite sides are provided with a relatively sharp contact edge 17. Inclined contact surfaces 18 extend above and below contact edge 17 and are connected across the upper and lower edges by the curved top and bottom of pin 14. By being so formed the contact edges 17 of the pins 14, when placed in openings 13, will engage the straight parallel sides of the openings 13 in the links 10 and the contact surfaces 18 of the pins above and below the contact edge 17 will allow only limited movement of the links pivoted on the pins, such turning movement being limited by engagement of the contact surfaces 18 with the parallel side surfaces of the openings 13 in the links 10 above and below the contact edges 17.

The chains further have side plates 150 extending between adjacent pins 14, each having a projecting portion extending beyond teeth 12 of the links 10. Side plates 150 are similar in shape to links 10 with the exception of the projecting portions replacing the teeth 12. Openings 19 in side plates 150 are identical in shape and position to openings 13 in links 10. These projecting portions of the side plates 150 ride in parallel grooves of the backing bar 137 and pressure bar 130 as seen in Fig. 2. Therefore, teeth 12 of the chain do not frictionally contact either the pressure bar 130 or backing bar 137 as the side plates 150 support the chain in their respective runways spaced from the backing bar 137 and the pressure bar 130.

This type of chain suspension limits the sliding contact between the chain and the backing bar or pressure bar to a substantially small area, thereby creating very little friction allowing the conveyor chains to last longer, run cooler, and require less power for motivation. Furthermore, by the side plates 150 feeding in the grooves of the backing bar 137 and the pressure bar 130, they are kept from sagging downwardly and thereby getting out of alignment with each other and causing improper operation of the heat sealing apparatus.

It will be obvious to those skilled in the art that various changes may be made in the invention, without departing from the spirit and scope thereof, and, therefore, the invention is not limited by that which is shown in the drawings and described in the specification, but only as indicated in the accompanying claims.

What is claimed is:

1. In a heat sealing machine, feeding means for feeding articles to be sealed, said feeding means comprising opposed silent chains driven in synchronism and receiving articles therebetween for feeding movement through said machine, each of said chains comprising a plurality of pivotally connected links, said links being substantially flat on the front edge and having teeth extending from their back edges, side plates on opposite sides of said links, said side plates extending outwardly of said links on the rear edge beyond said teeth to provide a series of transversely spaced projections, a backing bar engaging the inner run of one chain, a pressure bar engaging the inner run of the other chain, adjustable spring means for controlling the force exerted by the pressure bar on the other chain, and spaced slots forming guideways in said bars for slidably receiving said projections whereby said chains are maintained in alignment and prevented from sagging, said projections extending to the bottoms of said spaced slots thereby supporting said chain completely in said spaced slots.

2. In a heat sealing machine, feeding means for feeding articles to be sealed, said feeding means comprising opposed chains driven in synchronism and receiving said articles therebetween for feeding movement through said machine, each of said chains comprising a plurality of pivotally connected links said links being substantially flat on the front edge, transversely spaced projections on the rear edge of said links, a guide bar engaging the inner run of one chain, a guide bar engaging the inner run of the other chain, and spaced longitudinal grooves in said guide bars for slidably receiving said projections and spacing the links from said guide bars whereby said chains are maintained in alignment and prevented from sagging.

3. In a heat sealing machine, feeding means for feeding articles to be sealed, said feeding means comprising opposed chains driven in synchronism and receiving said articles therebetween for feeding movement through said machine, each of said chains comprising a plurality of pivotally connected links said links being substantially flat on the front edge, longitudinally spaced projections on the rear edge of said links, a guide bar engaging the inner run of one chain, a guide bar engaging the inner run of the other chain, and grooves in said guide bars for slidably receiving said projections whereby said chains are maintained in alignment and prevented from sagging.

4. In a conveyor mechanism, feeding means for feeding articles from one station to another station, said feeding means comprising opposed chains driven in synchronism and receiving articles therebetween for feeding, each of said chains comprising a plurality of pivotally connected links, said links being substatially flat on the front edge, transversely spaced projections extending beyond the rear edge of said links, opposed guiding means engaging the chains and supporting same said opposed guiding means including grooves for slidably receiving said projections whereby said chains are maintained in alignment and prevented from sagging.

5. In a conveyor mechanism feeding means for feeding articles from one station to another station, said feeding means comprising opposed chains driven in synchronism and receiving articles therebetween for feeding, each of said chains comprising a plurality of pivotally connected links, said links being substantially flat on the front edge, projections extending beyond the rear edge of said links, opposed guiding means engaging the chains and supporting same, said opposed guiding means including grooves for slidably receiving said projections whereby said chains are maintained in alignment and prevented from sagging.

6. In a heat sealing machine having sealing elements, feeding means for feeding articles to be sealed to said sealing elements, said feeding means comprising opposed chains driven in synchronism and receiving said articles therebetween for feeding movement through said machine, each of said chains comprising a plurality of pivotally connected links, said links being substantially flat on the front edge, side plates on opposite sides of said links, said side plates extending outwardly of said links on the rear edge to provide a series of transversely spaced projections, a backing bar engaging the inner run of one chain, a pressure bar engaging the inner run of the other chain, and spaced grooves in said bars for slidably receiving said projections whereby said chains are maintained in alignment and prevented from sagging.

7. In a heat sealing machine having sealing elements, feeding means for feeding articles to be sealed to said sealing elements, said feeding means comprising opposed chains driven in synchronism and receiving said articles therebetween for feeding movement through said machine, each of said chains comprising a plurality of pivotally connected links, said links being substantially flat on the front edge, transversely spaced projections on the rear edge of said links, a backing bar engaging the inner run of one chain, a pressure bar engaging the inner run of the other chain, and spaced grooves in said bars for slidably receiving said projections whereby said chains are maintained in alignment and prevented from sagging.

References Cited in the file of this patent

UNITED STATES PATENTS

| | | |
|---|---|---|
| 1,011,589 | Curtis | Dec. 12, 1911 |
| 1,691,871 | Reeves | Nov. 13, 1928 |
| 1,716,664 | Prince | June 11, 1929 |
| 2,082,206 | Jennings | June 1, 1937 |
| 2,167,179 | Joa | July 25, 1939 |

FOREIGN PATENTS

| | | |
|---|---|---|
| 3,888 | Great Britain | Feb. 12, 1912 |